(12) United States Patent
Sen et al.

(10) Patent No.: US 9,706,358 B2
(45) Date of Patent: Jul. 11, 2017

(54) DISTANCE DETERMINATION OF A MOBILE DEVICE

(71) Applicant: Hewlett-Packard Development Company, L.P., Houston, TX (US)

(72) Inventors: Souvik Sen, Palo Alto, CA (US); Jeongkeun Lee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/783,179

(22) PCT Filed: Apr. 12, 2013

(86) PCT No.: PCT/US2013/036502
§ 371 (c)(1),
(2) Date: Oct. 8, 2015

(87) PCT Pub. No.: WO2014/168637
PCT Pub. Date: Oct. 16, 2014

(65) Prior Publication Data
US 2016/0037302 A1    Feb. 4, 2016

(51) Int. Cl.
*H04W 4/02*   (2009.01)
*G01S 11/06*  (2006.01)
(Continued)

(52) U.S. Cl.
CPC ............. *H04W 4/023* (2013.01); *G01S 11/06* (2013.01); *H04W 24/02* (2013.01);
(Continued)

(58) Field of Classification Search
CPC .. H04B 7/0617; H04B 7/0634; H04B 7/0413; H04B 7/024; H04W 24/10; H04W 4/023;
(Continued)

(56) References Cited

U.S. PATENT DOCUMENTS

| 7,800,541 B2 | 9/2010 | Moshfeghi |
| 2004/0012524 A1 | 1/2004 | Couronne et al. |

(Continued)

FOREIGN PATENT DOCUMENTS

| CN | 101606076 | 12/2009 |
| CN | 102111209 | 6/2011 |

(Continued)

OTHER PUBLICATIONS

"Methodology for Testing Wireless LAN Performance with Chariot," Oct. 2003, pp. 1-11, Atheros.
(Continued)

*Primary Examiner* — Phuoc H Doan
(74) *Attorney, Agent, or Firm* — Hewlett Packard Enterprise Patent Department (57) ABSTRACT

A first energy of a signal received from a mobile device is computed at a device based on information available at a physical (PHY) layer of the mobile device. A second energy of the received signal is computed. A path-loss exponent of the received signal is computed based on a line-of-sight (LoS) factor (lfactor) of the signal. A distance of the mobile device to the device is computed based on the first energy, the second energy, and the path-loss exponent of the received signal.

18 Claims, 7 Drawing Sheets

(51) Int. Cl.
*H04W 24/02* (2009.01)
*H04W 64/00* (2009.01)
H04W 88/02 (2009.01)
H04W 88/08 (2009.01)

(52) U.S. Cl.
CPC .......... *H04W 64/003* (2013.01); *H04W 88/02* (2013.01); *H04W 88/08* (2013.01)

(58) Field of Classification Search
CPC ... H04W 64/003; H04W 24/02; H04W 88/02; H04W 72/12; H04W 72/046; H04L 5/0001; H04L 5/003; H04L 27/2607; H04L 5/0073
USPC .................. 455/456.2, 456.1, 517; 340/10.3; 375/227, 221; 370/329
See application file for complete search history.

(56) References Cited

U.S. PATENT DOCUMENTS

| | | |
|---|---|---|
| 2005/0285793 A1 | 12/2005 | Sugar et al. |
| 2008/0198072 A1 | 8/2008 | Elwell et al. |
| 2008/0280625 A1 | 11/2008 | Larsen |
| 2009/0017782 A1 | 1/2009 | Monat et al. |
| 2011/0021153 A1* | 1/2011 | Safavi .................. H04B 7/0434 455/63.1 |
| 2011/0287787 A1 | 11/2011 | Nagaraja et al. |
| 2012/0182144 A1 | 7/2012 | Richardson et al. |
| 2012/0269080 A1 | 10/2012 | Giustiniano et al. |
| 2012/0309415 A1 | 12/2012 | Rhoads |
| 2012/0329477 A1 | 12/2012 | Hall et al. |
| 2013/0010617 A1* | 1/2013 | Chen ..................... H04W 64/00 370/252 |
| 2013/0051255 A1 | 2/2013 | Estevez et al. |

FOREIGN PATENT DOCUMENTS

| | | |
|---|---|---|
| CN | 102970257 | 3/2013 |
| WO | WO-2011084063 | 7/2011 |

OTHER PUBLICATIONS

International Search Report and Written Opinion, International Application No. PCT/US2013/036502, Date: Jan. 17, 2014, pp. 1-7.
CN First Office Action dated Nov. 23, 2016, CN Patent Application No. 201380076711.0 dated Apr. 12, 2013, State Intellectual Property Office of the P.R. China, 7 pages.
Sen et al., "SpinLoc: Spin Once to Know Your Location", HotMobile'12, Feb. 28-29, 2012, ACM, San Diego, California, United States of America, 6 pages.

\* cited by examiner

DISTANCE DETERMINATION OF A MOBILE DEVICE

BACKGROUND

Extensive interest in location-aware services or location based services (LBS) has driven many indoor localization techniques. For example, crowd-sourced Wi-Fi based localization techniques utilize user input for radio frequency (RF) scene analysis and map construction. Other techniques include expert based site surveys, for example.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Estimating the distance of a mobile device from its access point (AP) is an important primitive for wireless systems. Accurate distance estimation can contribute towards Wi-Fi based indoor localization. For example, multiple APs can estimate the distance of a mobile device, and further collaborate to find the location of the mobile device. Current techniques for estimating the distance of the mobile device utilize received signal strength indicator (RSSI) of a received signal at the AP. However, distance estimation based on RSSI is dependent on environmental factors (e.g., walls, furniture, doors, etc). Thus, distance computation based on RSSI performs poorly indoors primarily due to multipath reflections.

Accordingly, examples disclosed herein describe a solution for computing the distance of a mobile device from an AP using the energy on the direct path signal (e.g., ignoring energy on reflected paths of the signal). While RSSI is a sum total of the energy traversing on all the signal paths between the mobile device and the AP, by concentrating on the energy on the direct path, distance estimation error may be eliminated or reduced (e.g., to less than 4 m).

In one example, a device includes a signal processing unit to compute a first energy of a signal received from a mobile device based on information available at a physical (PHY) layer of the mobile device. The signal processing unit is to compute a second energy of the received signal. The signal processing unit is to compute a path-loss exponent of the received signal based on a line-of-sight (LoS) factor (lfactor) of the signal. The signal processing unit is further to compute a distance of the mobile device to the device based on the first energy, the second energy, and the path-loss exponent of the received signal.

In another example, a method for determining a distance of a mobile device from a wireless access point (AP) includes computing, by a signal processing unit of the AP, a first energy of a received signal transmitted from the mobile device based on information available at a PHY layer of the mobile device. The method includes computing, by the signal processing unit, a second energy of the received signal. The method includes computing, by the signal processing unit, a path-loss exponent of the received signal based on a line-of-sight (LoS) factor (lfactor) of the received signal. The method also includes computing, by the signal processing unit, a distance of the mobile device to the AP based on the first energy, the second energy, and the path-loss exponent of the received signal.

In another example, a non-transitory computer-readable storage medium includes instructions that, when executed by a processor of a base station, cause the processor to compute a first energy of a signal received from a mobile device based on information available at a physical (PHY) layer of the mobile device, where the PHY layer information includes channel state information (CSI). The instructions are executable to compute a second energy of the received signal. The instructions are executable to compute a path-loss exponent of the received signal based on a line-of-sight (LoS) factor (lfactor) of the signal and an energy of direct path (EDP) of the signal, where the lfactor is computed based on a ratio of the EDP to received signal strength indicator (RSSI). The instructions are further executable to compute a distance of the mobile device to the base station based on the first energy, the second energy, and the path-loss exponent of the received signal.

It is appreciated that examples described herein below may include various components and features. Some of the components and features may be removed and/or modified without departing from a scope of the method, system, and non-transitory computer-readable medium for determining the distance of a mobile device. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

Figure 1:
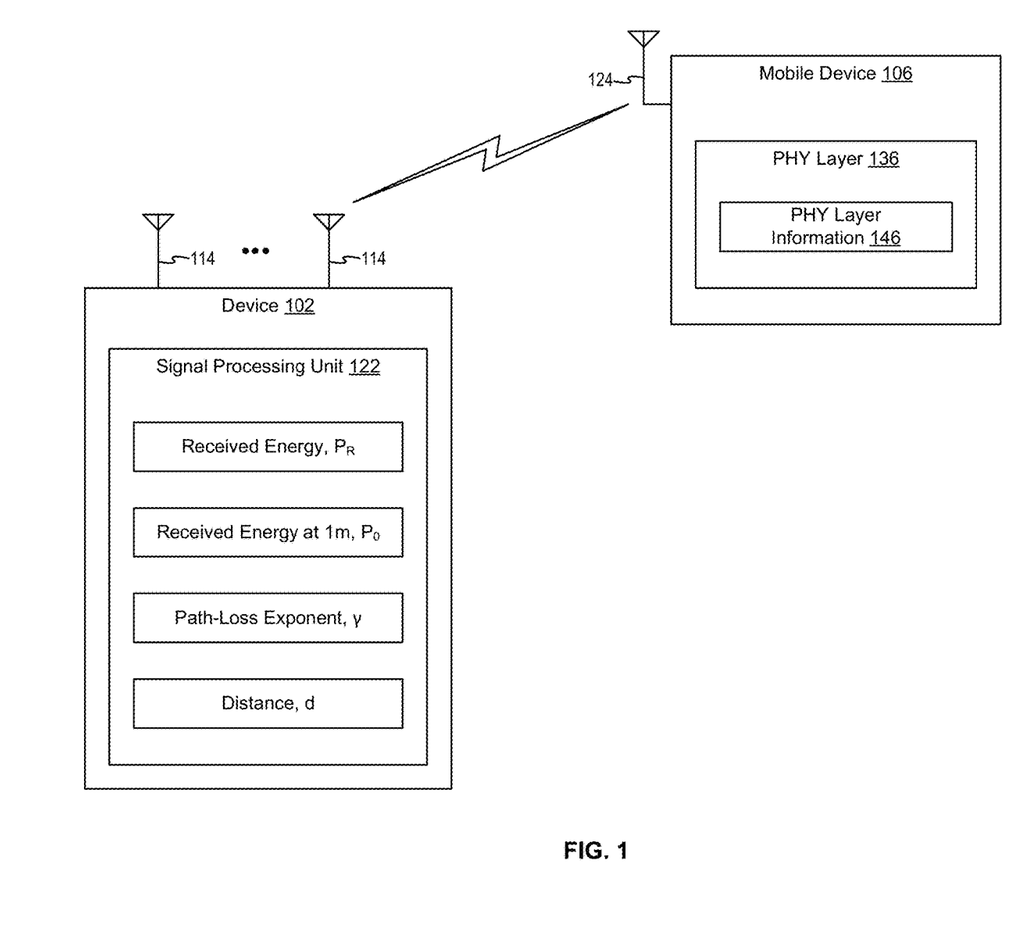
FIG. 1 is a block diagram of a device for determining the distance of a mobile device, according to one example.

Referring to FIG. 1, a block diagram of a device for determining the distance of a mobile device, according to one example, is described. Device 102 can be a base station, a wireless access point (AP), a switch, a router, a hub, or any other device capable of transmitting and receiving wireless transmissions from other devices, such as mobile device 106. Thus, device 102 may serve as a hub of a wireless network (e.g., Wi-Fi network, cellular network). Further, data may be exchanged between device 102 and one or more mobile devices 106 in the form of wireless signals. Accordingly, as used herein "signal" includes all forms of wireless transmissions (e.g., signals, data packets, etc).

Device 102 includes at least one antenna 114 that may be coupled to a transceiver (not shown) for transmitting and receiving signals from mobile device 106. Device 102 also includes a signal processing unit 122 for processing signals received from mobile device 106. Signal processing unit 122 can be implemented in the form of hardware and/or software.

Mobile device 106 may be a smartphone, a mobile phone, a personal digital assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device with one or more antennas 124 for transmitting and receiving signals.

A wireless signal transmitted from mobile device 106 may traverse in all radial directions, and reflect off walls, furniture, and other objects. Due to reflections, multiple copies of the same signal may arrive at a receiver of the device 102, each undergoing different delay and attenuation—a phenomenon commonly referred to as "multipath." As used herein, a "direct path" of the signal is the straight line joining the mobile device 106 and the device 102. Thus, the signal transmitted from the mobile device 106 is composed of a direct path, and other reflected components/paths, and suffers attenuation as it propagates from the mobile device 106 to the device 102. Indoors, wireless attenuation is mainly caused by path-loss, and multipath reflections.

Accordingly, signal processing unit 122 computes the distance between the mobile device 106 and the device 102 by using the received energy of the signal at the receiver ($P_R$) (i.e., the device 102) in the path-loss equation:

$$P_R = P_0 - 10\gamma \log(d),$$

where $P_0$ is computed based on the received energy when the transmitter (i.e., the mobile device 106) is at a distance of 1 m from the receiver, or based on the transmit power of the transmitter (e.g., when the transmit power of the transmitter is known), d is the distance between the transmitter and the receiver in meters, and γ is the path-loss exponent. γ depends on the propagation characteristics of the received signal. Current techniques for determining the distance have typically used RSSI as the received energy ($P_R$) in the above path-loss equation. However, RSSI is a union of the energy of all the signal paths (i.e., direct and multipath reflections). If RSSI is used as the received energy ($P_R$) it may be necessary to estimate the propagation characteristics of all the signal paths, to correctly choose the path-loss exponent γ. Unfortunately, commodity Wi-Fi cards for example do not provide any specific multipath information, making it difficult to choose the correct path-loss exponent. Rather than trying to model the aggregate signal (RSSI), signal processing unit 122 of the described solution utilizes the energy of the direct path (EDP), as described in further detail below. Since EDP is not sensitive to the energy of the reflected paths, it is a robust indicator of distance, even in dynamic indoor environments.

Figure 2A:
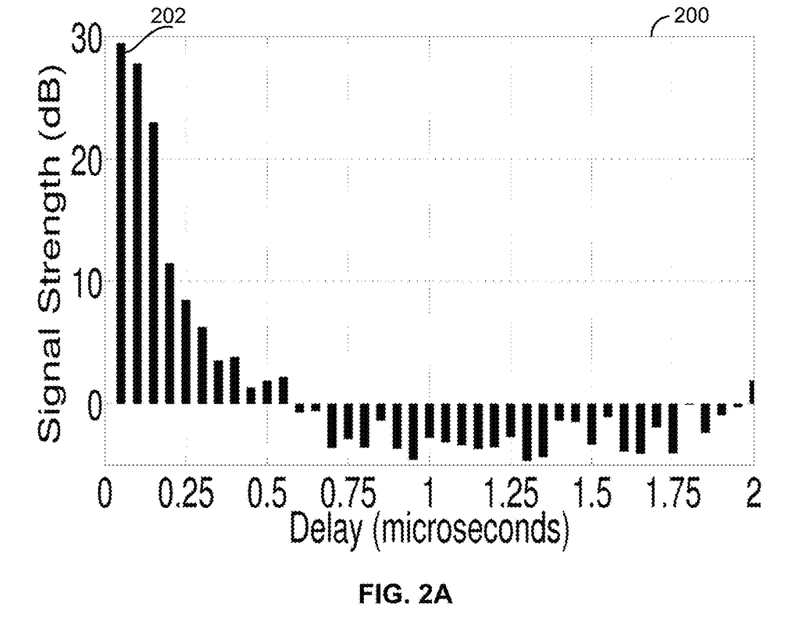
FIGS. 2A and 2B are graphs illustrating power delay profiles (PDP) of signals transmitted from two mobile devices.
Figure 2B:
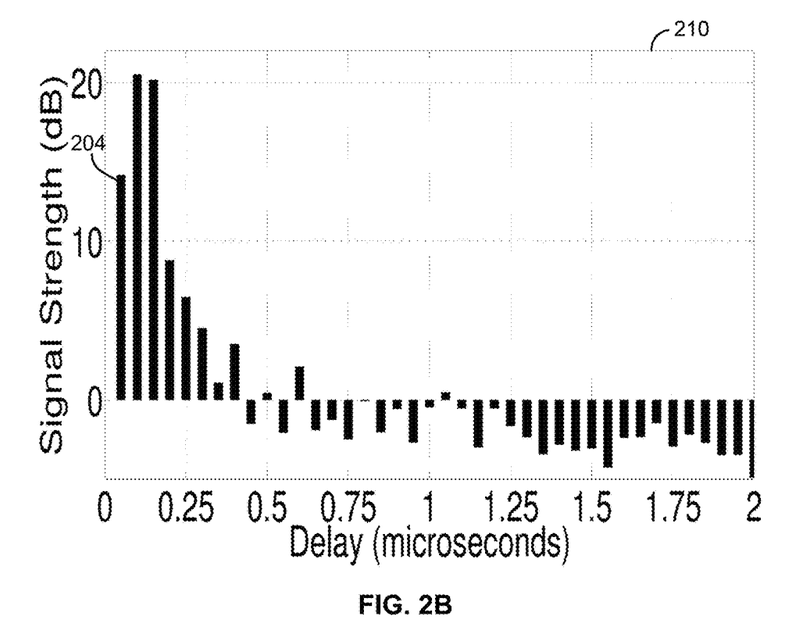

The EDP may be derived from information 146 available at the PHY layer 136 of the mobile device. For example, commodity chipsets (Wi-Fi chipsets) of the mobile device can export the channel state information (CSI) from the PHY layer 136 to the driver of the mobile device 106. The delay and attenuation of different signal paths are computed in the CSI. To illustrate, if a transmitter transmits a symbol X, the quality of the received symbol at the receiver Y, depends on the CSI, H, given by the following equation:

$$Y = H \ast X + n,$$

where n captures noise. The CSI is reported as a matrix of complex numbers representing the channel gain for every subcarrier and for every transmit-receive antenna pair. By applying an appropriate Inverse Fast Fourier Transform (IFFT), the frequency-domain CSI can be translated into the time-domain power delay profile (PDP). The PDP captures the energy of the different paths incident at increasing delays. Since the direct path traverses the minimum distance amongst all the received paths, the energy of the direct path will likely appear in the earliest component of the PDP. FIGS. 2A and 2B illustrate the PDP for two mobile devices 106 that are equidistant from the device 102. Thus, while it may be difficult to capture multipath characteristics of a signal using RSSI, the PDP obtained from the CSI information (based on the PHY layer information 146) can estimate the multipath characteristics.

Due to bandwidth limitations, it may not be possible to distinguish every signal path from the PDP. For example, the resolution of the PDP with a 20 MHz 802.11n OFDM reception is approximately 50 ns. However, as discussed above, the first component of the PDP is likely to contain the direct path signal. The first component may also contain a few other reflected paths, which arrive at almost the same time as the direct path. However, the later arriving components in the PDP correspond to reflected paths which have traversed significantly longer distances (e.g., more than 15 m than the direct path, due to the 50 ns resolution). Hence, based on this, the reflected components are ignored while computing the distance between the mobile device 106 and the device 102. Accordingly, the energy of the first component of the PDP is selected as the energy of the direct path (EDP). Thus, the EDP based distance estimation is more robust than the RSSI based distance estimation, since it is much less susceptible to multipath reflections. Accordingly, signal processing unit 122 computes the received energy of the signal at the receiver ($P_R$) for input into the path-loss equation as the EDP (i.e., first component of the PDP).

It should be noted that EDP may be susceptible to shadowing. Thus, the described solution accounts for shadowing effects. For example, the direct path between device 102 (e.g., an AP) and the mobile device 106 may be blocked by the user carrying the mobile device 106. At the same location, the estimated EDP may be higher when the user faces the AP with the phone (i.e., line-of-sight (LoS)) versus when the user's back is turned to the AP (i.e., non line-of-sight (NLoS)). It is noted that a blockage on only the direct path may not affect the other reflected components. Based on this observation, the likelihood of LoS is quantified by computing the LoS factor (lfactor) as:

$$lfactor = \frac{EDP}{RSSI}.$$

It should be noted that in certain other examples, the lfactor may be computed as a ratio of the EDP to the aggregate or total energy from all components of the PDP. Thus, in such examples, the RSSI may not be used rather, other measurements that capture the total energy of all the components of the PDP may be used.

Figure 3:
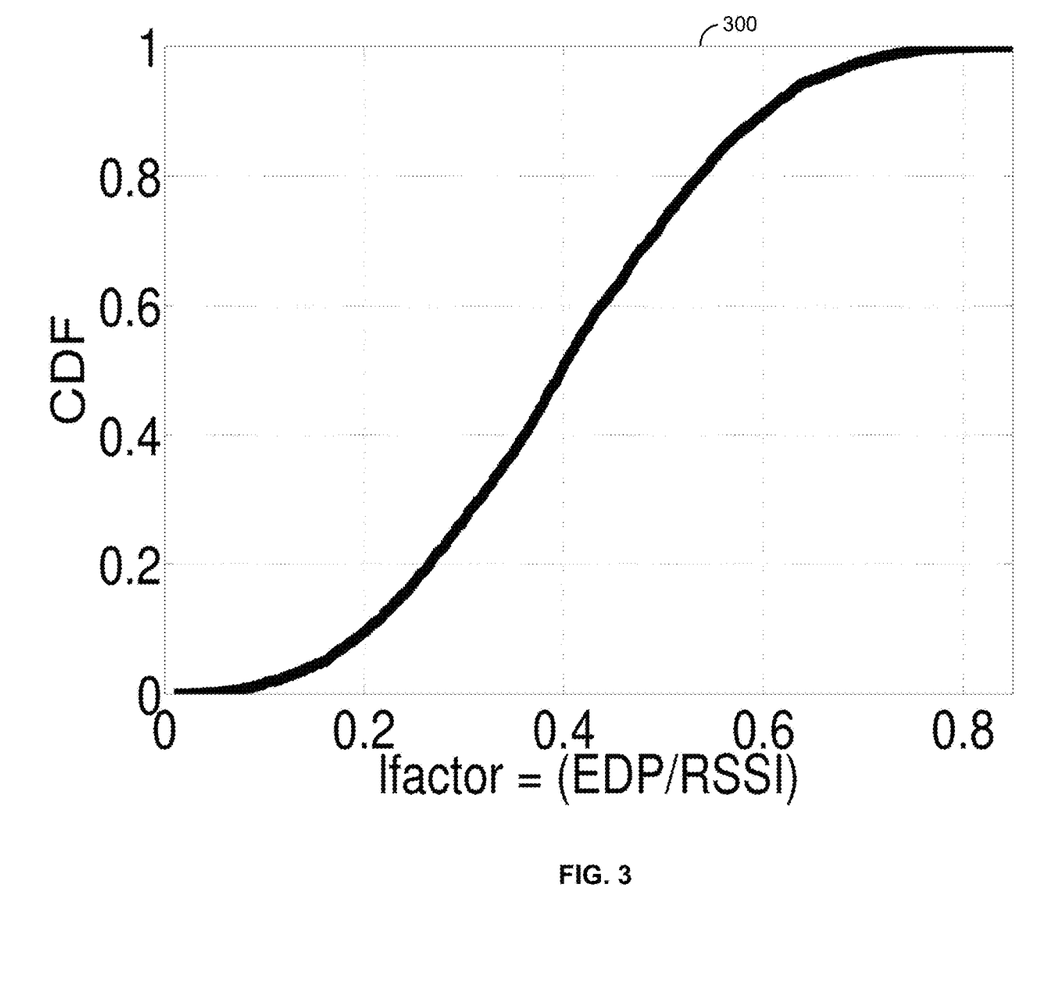
FIG. 3 is a graph illustrating a cumulative distribution function (CDF) of line-of-sight (LoS) factor (lfactor) values at 500 locations, according to an example.

FIG. 3 demonstrates that a wide range of lfactor values can occur in an indoor setting. A high lfactor will imply that most of the received signal arrives along the direct path, for example, in a corridor scenario with LoS. On the other hand, if the direct path is blocked, a low lfactor value may be observed. Thus, the path-loss exponent for the direct path is inversely proportional to the lfactor. Based on experimental results (e.g., FIGS. 4 and 5), the inverse relationship between the path-loss exponent for the direct path and the lfactor may not depend on a particular AP or environment. The lfactor directly estimates the environmental factors affecting the EDP, which ultimately governs the path-loss exponent ($\gamma$). Hence, the relationship between the path-loss exponent ($\gamma$) and the lfactor does not vary significantly over different environments. For example, measurements from a few known locations can adequately establish this relation, and the same relation can be applied to other environments.

Thus, the signal processing unit 122 computes all variables (i.e., $P_R$, $P_0$, and $\gamma$) for computing the distance d of the mobile device 106 from the path-loss equation (i.e., $P_R = P_0 - 10\gamma \log(d)$). In particular, the signal processing unit 122 computes the EDP and the lfactor from the CSI of the mobile device's transmission (i.e., based on the PHY layer information 146), and thereafter uses the lfactor-to-$\gamma$ relation to select a correct path loss $\gamma$ for each received packet. The signal processing unit 122 then calculates the distance to the mobile device 106 using the path-loss equation with EDP and path loss exponent as inputs. Thus, by choosing the correct path-loss exponent, the described solution allows distance estimation to adapt to fast fading on a per-packet basis. Further, by using EDP and lfactor as inputs, the described solution significantly reduces distance estimation errors compared to using RSSI (e.g., 4 m compared to 10 m).

FIGS. 2A and 2B are graphical illustrations 200 and 210, respectively, of signal strength (in dB) versus delay (in microseconds) representing power delay profiles (PDPs) of two different indoor transmissions. The graphical illustrations 200 and 210 represent two different mobile devices 106 that are equidistant from the device 102. For the first mobile device 106 (FIG. 2A), the direct path does not pass through any obstructions (i.e., there is a direct LoS), and thus yields the strongest component. The EDP is represented by the first bar 202 of the graph 200 (subsequent bars represent the later arriving reflected paths). However, for the second mobile device 106 (FIG. 2B), the direct path's trajectory is blocked by the user standing between the second mobile device 106 and the device 102. Thus, the direct path, represented by the first bar 204 of the graph 210, is attenuated, and appears weaker than stronger reflected paths. As explained above, RSSI cannot discriminate between the above scenarios, thereby resulting in large errors. The described solution however mitigates the distance error due to multipath by using only the energy of the direct path (EDP).

FIG. 3 is a graphical illustration 300 of a cumulative distribution frequency (CDF) versus the lfactor, where the lfactor is computed as a ratio of the EDP to the RSSI. The graph 300 of CDF versus lfactor was generated at 500 locations. Graph 300 demonstrates that a wide range of lfactor values can occur in an indoor setting. A high lfactor will imply that most of the received signal arrives along the direct path, for example in a corridor scenario with LoS. On the other hand, if the direct path is blocked, a low lfactor value will result. Accordingly, the path-loss exponent ($\gamma$) will be inversely proportional to the lfactor. It should be noted that in some examples, the relationship between the path-loss exponent ($\gamma$) and the lfactor may be at least one of a linear inverse relationship, a square inverse relationship, a cubic inverse relationship, and a log inverse relationship. Further, in some examples, the lfactor may be computed as a ratio of the EDP to the aggregate energy from the components of the PDP.

Figure 4:
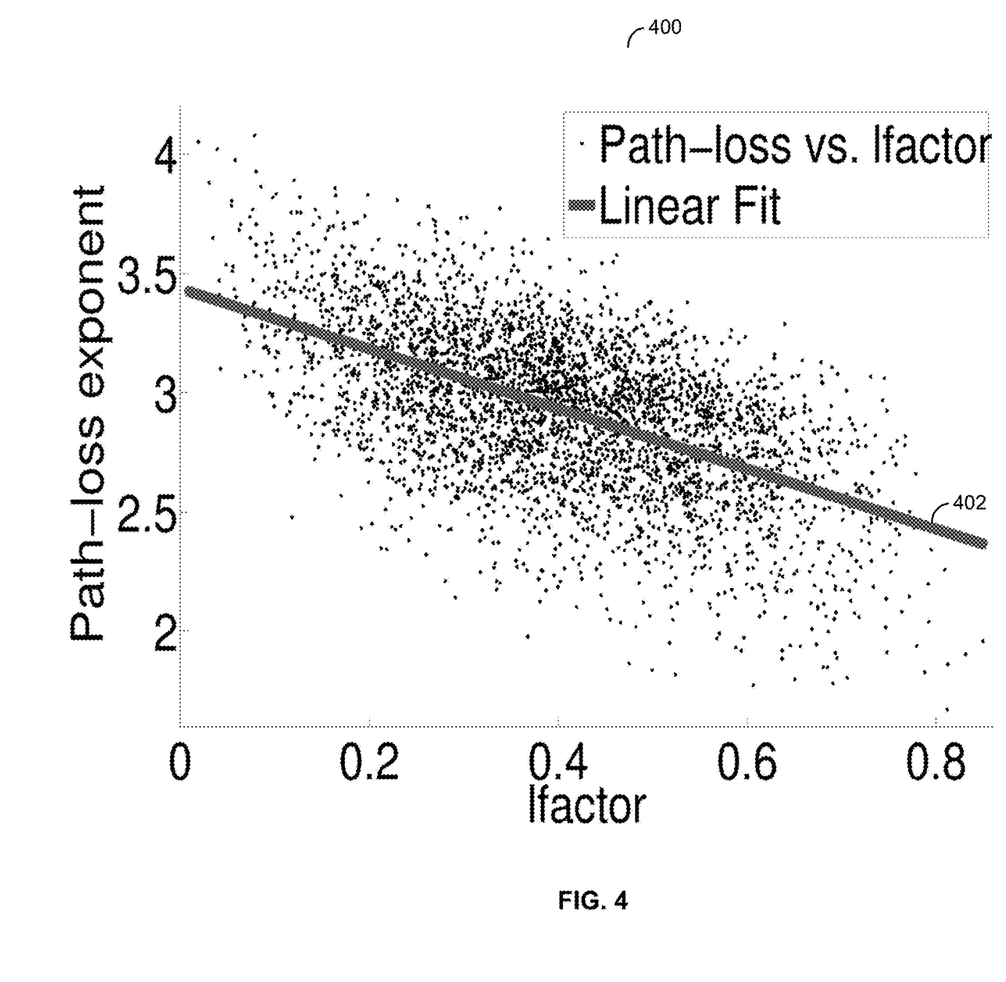
FIG. 4 is a graph illustrating a relationship between the path-loss exponent and the lfactor at 500 locations, according to an example.

FIG. 4 is a graphical illustration 400 of the path-loss exponent ($\gamma$) versus the lfactor. Graph 400 shows the EDP path-loss exponent ($\gamma$) with increasing lfactor for transmissions to a single device 102 (e.g., AP). It is further observed that the result is similar for other devices 102 (APs). From the measurements indicated in graph 400, a linear fitting 402 can be applied to establish a relationship between path-loss exponent ($\gamma$) and lfactor, as shown. Further, the path-loss ($\gamma$) versus lfactor relationship is independent on a particular AP or environment, as established by the results of FIG. 5.

Figure 5:
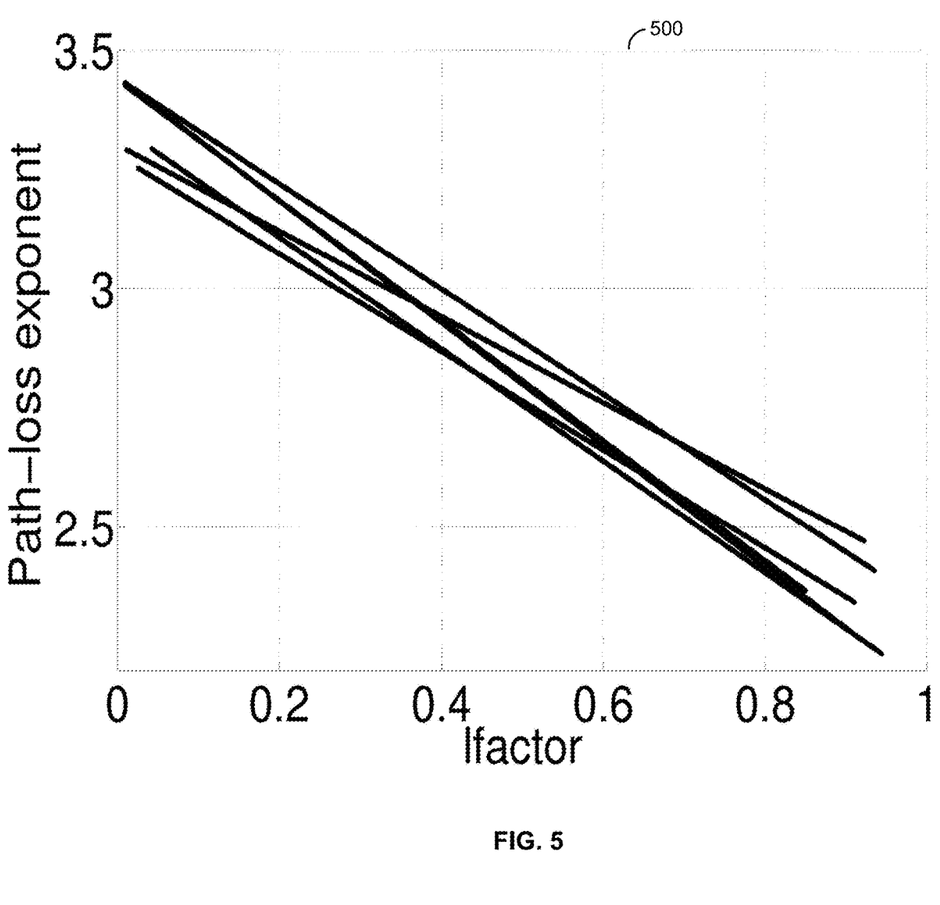
FIG. 5 is a graph illustrating a relationship between the path-loss exponent and the lfactor for 5 APs, according to an example.

FIG. 5 is a graphical illustration 500 of the path-loss exponent ($\gamma$) versus the lfactor for 5 different APs. The lines are similar because lfactor directly estimates the environmental factors affecting the EDP, which ultimately governs the path-loss exponent ($\gamma$). Hence, the relationship between the path-loss exponent ($\gamma$) and lfactor does not vary significantly over different environments. Measurements from a few locations can adequately establish the relation, and the same relation can be applied to other environments.

Figure 6:
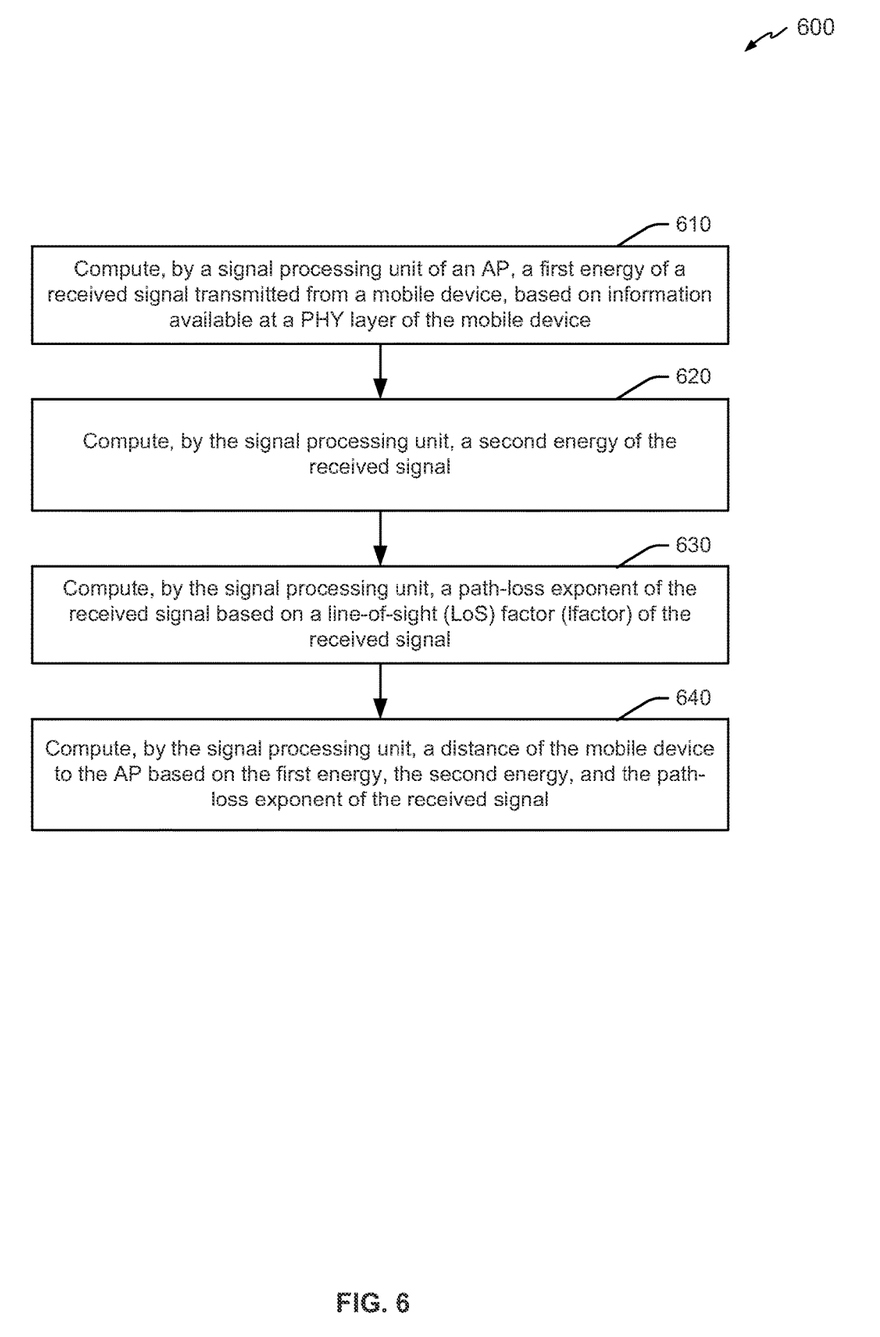
FIG. 6 is a flowchart of a method for determining the distance of a mobile device from an AP, according to one example.

FIG. 6 is a flowchart of a method 600 for determining the distance of a mobile device from an AP, according to one example. Method 600 may be implemented in the form of executable instructions stored on a non-transitory computer-readable storage medium and/or in the form of electronic circuitry.

Method 600 includes computing, by a signal processing unit of an AP, a first energy of a received signal transmitted from a mobile device, based on information available at a PHY layer of the mobile device, at 610. For example, signal processing unit 122 may compute the received energy of the signal at the device 102 ($P_R$) as the EDP, where the EDP is obtained from CSI, and where the CSI is included in the PHY layer information 146 available at the PHY layer 136 of the mobile device 106.

Method 600 includes computing, by the signal processing unit, a second energy of the received signal, at 620. In one example, the second energy is computed based on the energy of the received signal when the mobile device 106 is 1 m from the AP. In other examples, where the transmit power of the mobile device is known, the second energy is computed based on the transmit power of the mobile device 106.

Method 600 includes computing, by the signal processing unit, a path-loss exponent of the received signal based on a line-of-sight (LoS) factor (lfactor) of the received signal, at 630. For example, the signal processing unit 122 may compute the path-loss exponent ($\gamma$) based on the lfactor. The lfactor is computed based on a ratio of the EDP to the RSSI of the received signal. Further, a relationship is established between the path-loss exponent ($\gamma$) and the lfactor. Thus, a path-loss exponent value is selected based on the lfactor-to-$\gamma$ relationship.

Method 600 also includes computing, by the signal processing unit, a distance of the mobile device to the AP based on the first energy, the second energy, and the path-loss exponent of the received signal, at 640. For example, the signal processing unit 122 computes the distance d using with the EDP and path-loss exponent ($\gamma$) as inputs.

Figure 7:
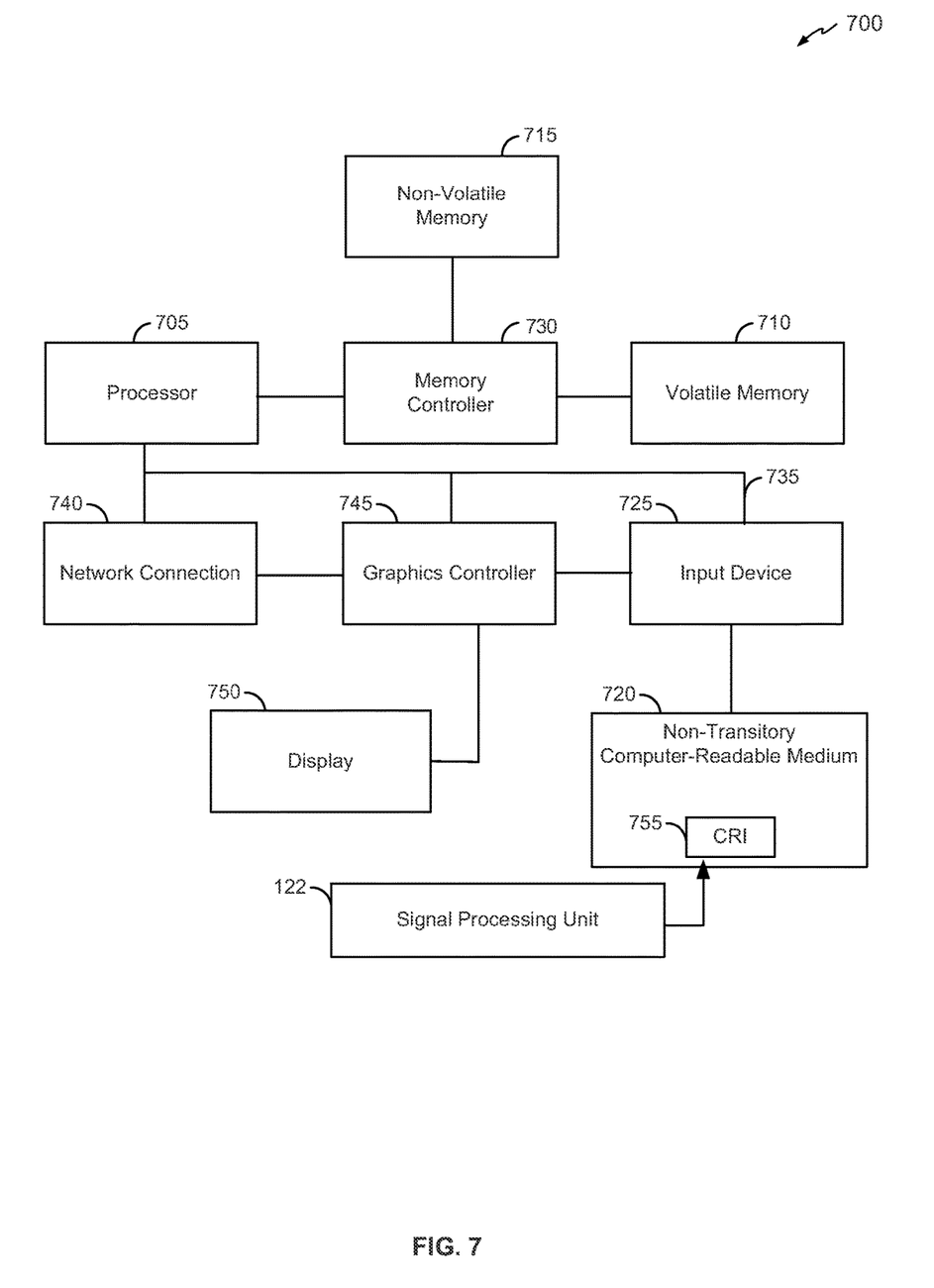
FIG. 7 is a block diagram of an example component for implementing the device of FIG. 1, according to various examples.

The signal processing unit 122 of FIG. 1 can be implemented in hardware, software, or a combination of both. FIG. 7 illustrates a component for implementing the signal processing unit 122 according to various examples. The component 700 can include a processor 705 and memory resources, such as, for example, the volatile memory 710 and/or the non-volatile memory 715, for executing instructions stored in a tangible non-transitory medium (e.g., volatile memory 710, non-volatile memory 715, and/or non-transitory computer-readable medium 720). The non-transitory computer-readable medium 720 can have computer-readable instructions 755 stored thereon that are executed by the processor 705 to implement the functionalities of the present disclosure.

A machine (e.g., a computing device) can include and/or receive a tangible non-transitory computer-readable medium 720 storing a set of computer-readable instructions (e.g., software) via an input device 725. As used herein, the processor 705 can include one or a plurality of processors such as in a parallel processing system. The memory can include memory addressable by the processor 705 for execution of computer readable instructions. The computer readable medium 720 can include volatile and/or non-volatile memory such as a random access memory ("RAM"), magnetic memory such as hard disk, floppy disk, and/or tape memory, a solid state drive ("SSD"), flash memory, phase change memory, and so on. In some examples, the non-volatile memory 715 can be a local or remote database including a plurality of physical non-volatile memory devices.

The processor 705 can control the overall operation of the component 700. The processor can be connected to a memory controller 730, which can read and/or write data from and/or to volatile memory 710 (e.g., RAM). The processor 705 can be connected to a bus 735 to provide communication between the processor 705, the network connection 740, and other portions of the component 700. The non-volatile memory 715 can provide persistent data storage for the component 700. Further, the graphics controller 745 can connect to an optical display 750.

Each component 700 can include a computing device including control circuitry such as a processor, a state machine, ASIC, controller, and/or similar machine. As used herein, the indefinite articles "a" and/or "an" can indicate one or more of the named objects. Thus, for example, "a processor" can include one or more than one processor, such as in a multi-core processor, cluster, or parallel processing arrangement.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. For example, it is appreciate that the present disclosure is not limited to a particular configuration, such as component 700.

Those skilled in the art would further appreciate that the various illustrative modules and steps described in connection with the examples disclosed herein may be implemented as electronic hardware, computer software, or combination of both. For example, the steps of FIG. 6 may be implemented using software modules, hardware modules or components, or a combination of software and hardware modules or components. Thus, in one example, one or more of the steps of FIG. 6 may comprise hardware modules or components. In another example, one or more of the steps of FIG. 6 may comprise software code stored on a computer readable storage medium, which is executable by a processor.

To clearly illustrate this interchangeability of hardware and software, various illustrative components, blocks, modules, and steps have been described above generally in terms of their functionality (e.g., signal processing unit 122). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A device comprising a signal processing unit to:
compute a first energy of a signal received from a mobile device based on information available at a physical (PHY) layer of the mobile device;
compute a second energy of the received signal;
compute a path-loss exponent of the received signal based on a line-of-sight (LoS) factor (lfactor) of the signal; and
compute a distance of the mobile device to the device based on the first energy, the second energy, and the path-loss exponent of the received signal.

2. The device of claim 1, wherein the second energy is computed based on energy of the signal when the mobile device is 1 meter from the device.

3. The device of claim 1, wherein the PHY layer information comprises channel state information (CSI), wherein the CSI includes a power delay profile (PDP) for the signal.

4. The device of claim 3, wherein the PDP includes energy corresponding to a plurality of paths of the signal incident at a receiver of the device at increasing time delays, and wherein the plurality of paths includes a direct path of the signal and at least one reflected path of the signal.

5. The device of claim 4, wherein energy corresponding to a first component of the PDP is identified as energy of the direct path (EDP), and wherein energy corresponding to other components of the PDP is ignored.

6. The device of claim 5, wherein the lfactor is computed based on a ratio of the EDP to received signal strength indicator (RSSI) of the signal, and wherein the lfactor is inversely proportional to the path-loss exponent.

7. The device of claim 6, wherein the distance is computed according to a solution of:

$$P_R = P_0 - 10\gamma \log(d),$$

wherein $P_R$ is the first energy of the received signal computed based on the PHY layer information,
wherein $P_0$ is the second energy based on at least one of energy of the received signal at a distance of 1 m from the device, and transmit power of the mobile device,
wherein $\gamma$ is the path-loss exponent of the received signal based on the lfactor and the EDP, and
wherein d is the distance of the mobile device to the device.

8. The device of claim 7, wherein the lfactor is computed according to a solution of:

$$lfactor = \frac{EDP}{RSSI}.$$

9. The device of claim 1, wherein the device comprises at least one of a wireless access point (AP) and a cellular base station.

10. The device of claim 1, wherein the second energy is computed based on a transmit power of the mobile device.

11. The device of claim 1, wherein the signal is a direct path signal received from the mobile device, and wherein the direct path signal is extracted from the PHY layer information of the mobile device.

12. The device of claim 11, wherein non-direct path signal received from the mobile device is ignored, wherein the non-direct path signal includes reflected path signals.

13. A method for determining a distance of a mobile device from a wireless access point (AP), the method comprising:
 computing, by a signal processing unit of the AP, a first energy of a received signal transmitted from the mobile device based on information available at a physical (PHY) layer of the mobile device;
 computing, by the signal processing unit, a second energy of the received signal;
 computing, by the signal processing unit, a path-loss exponent of the received signal based on a line-of-sight (LoS) factor (lfactor) of the received signal; and
 computing, by the signal processing unit, a distance of the mobile device to the AP based on the first energy, the second energy, and the path-loss exponent of the received signal.

14. The method of claim 13,
 wherein the second energy is computed based on at least one of energy of the signal when the mobile device is 1 meter from the AP and transmit power of the mobile device, and
 wherein the PHY layer information comprises channel state information (CSI), wherein a power delay profile (PDP) of the signal is obtained based on the CSI.

15. The method of claim 14, wherein the PDP comprises an energy of the direct path (EDP) and an energy of at least one reflected path of the signal.

16. The device of claim 15, wherein the lfactor is computed based on a ratio of the EDP of the signal to a received signal strength indicator (RSSI) of the signal, and wherein the lfactor is inversely proportional to the path-loss exponent.

17. A non-transitory computer-readable storage medium comprising instructions that, when executed by a processor of a based station, cause the processor to:
 compute a first energy of a signal received from a mobile device based on information available at a physical (PHY) layer of the mobile device, wherein the PHY layer information includes channel state information (CSI);
 compute a second energy of the received signal;
 compute a path-loss exponent of the received signal based on a line-of-sight (LoS) factor (lfactor) of the signal and energy of direct path (EDP) of the signal, wherein the lfactor is computed based on a ratio of the EDP to received signal strength indicator (RSSI) of the signal; and
 compute a distance of the mobile device to the base station based on the first energy, the second energy, and the path-loss exponent of the received signal.

18. The non-transitory computer-readable storage medium of claim 17, wherein the lfactor is inversely proportional to the path-loss exponent.

* * * * *